United States Patent [19]
Hurdle

[11] Patent Number: 5,795,120
[45] Date of Patent: Aug. 18, 1998

[54] REDUCED-FRICTION THREAD FORMING OR THREAD CUTTING SCREW

[76] Inventor: Donald R. Hurdle, N 1313 Cottage Dr., Oostburg, Wis. 53070

[21] Appl. No.: 644,954

[22] Filed: May 13, 1996

[51] Int. Cl.⁶ .................... F16B 25/00; B23B 51/00
[52] U.S. Cl. .................... 411/386; 411/412; 408/229
[58] Field of Search .................... 411/386, 387, 411/412, 413, 414, 416, 411; 408/229, 230

[56] References Cited

U.S. PATENT DOCUMENTS

| | | |
|---|---|---|
| 3,351,115 | 11/1967 | Boehlow . |
| 3,426,642 | 2/1969 | Phipard, Jr. . |
| 3,527,136 | 9/1970 | Wilson .................... 411/386 X |
| 3,831,415 | 8/1974 | Skierski .................... 72/88 |
| 3,935,785 | 2/1976 | Lethom . |
| 3,939,512 | 2/1976 | Thurston et al. . |
| 3,978,760 | 9/1976 | Muenchinger .................... 411/386 |
| 4,040,328 | 8/1977 | Muenchinger . |
| 4,259,889 | 4/1981 | Capuano .................... 411/417 |
| 4,844,676 | 7/1989 | Adamek .................... 411/386 |

*Primary Examiner*—Neill R. Wilson
*Attorney, Agent, or Firm*—Godfrey & Kahn, S.C.

[57] ABSTRACT

A screw or tap for forming or cutting threads in a workpiece. The screw includes a cylindrical shank directed along a longitudinal axis. The shank includes a work holding portion having a plurality of helical threads of a constant crest diameter, a constant root diameter, a constant pitch diameter, and circular cross-section. The shank also has a lead portion having at least a portion of a helical thread. Intermediate the work holding portion and the lead portion is a forming portion. The forming portion has at least one full thread located thereon having a crest diameter which is greater than the crest diameter of the plurality of helical threads on the holding portion, a root diameter which is larger than the root diameter of the plurality of helical threads on the holding portion, and a pitch diameter which is proportionally greater than the pitch diameter of the holding portion. A coupler is located at the second end of the cylindrical shank for accepting or coupling with a driving tool such as a screwdriver. The screw may be designed to form threads, in which case the one full thread on the forming portion is lobular-shaped and has a lobular profile which is greater that the constant profile of the threads on the holding portion. When designed to cut threads, the screw has at least one groove formed in the shank which has a cutting edge and extends through the forming thread on the forming portion.

20 Claims, 5 Drawing Sheets

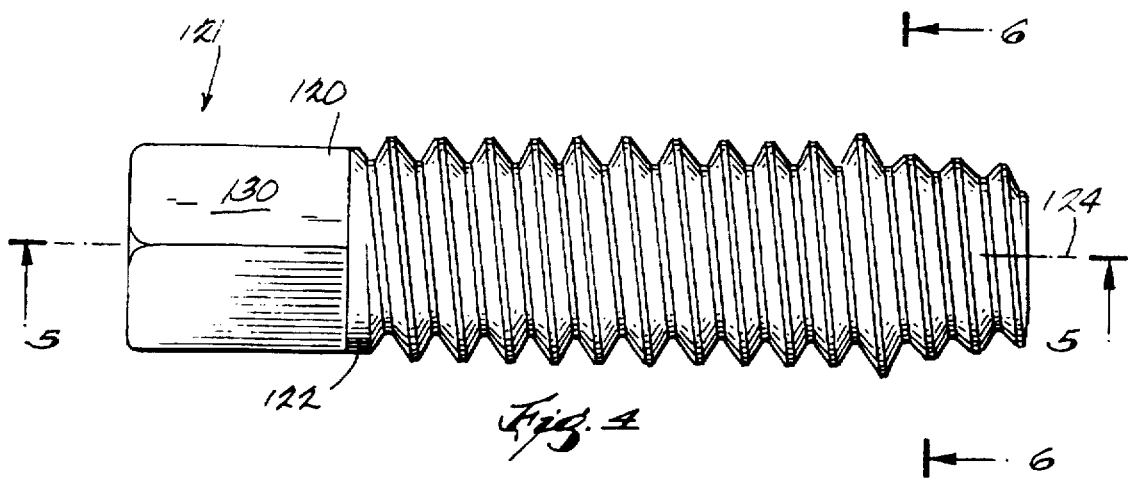
Fig. 4
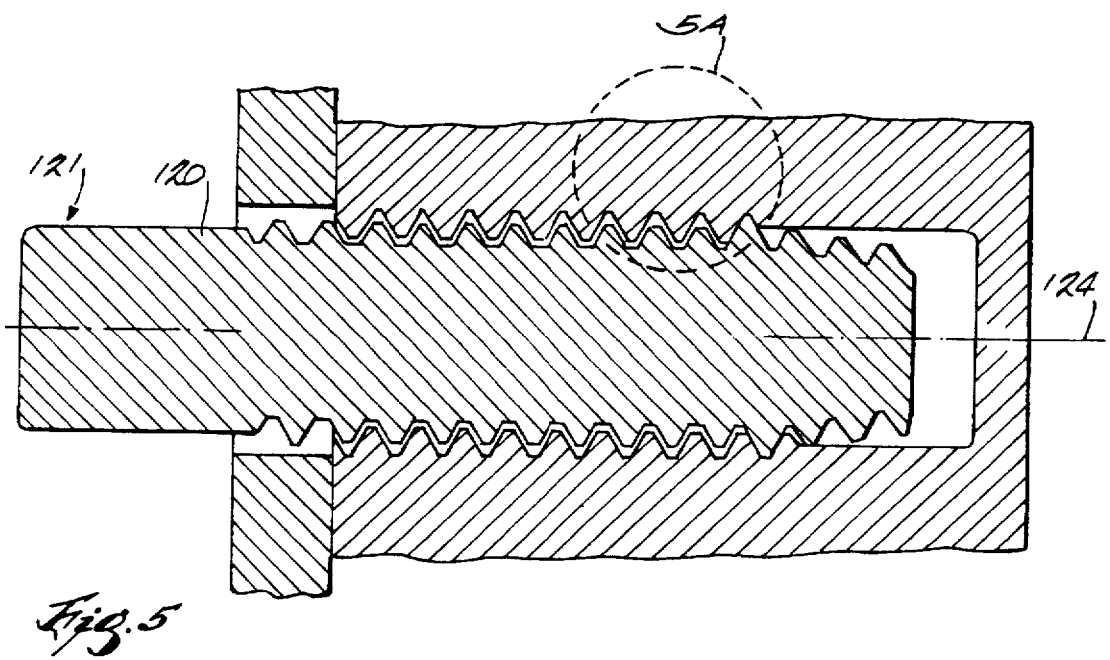
Fig. 5
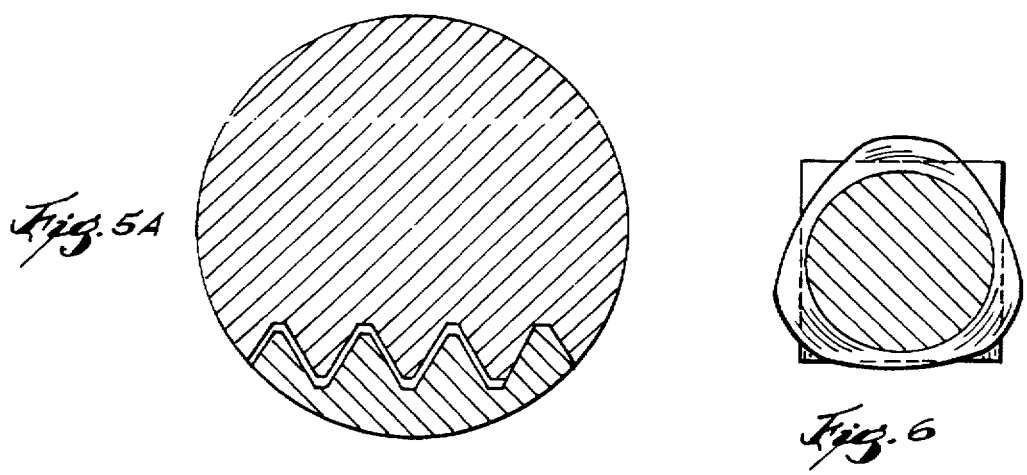
Fig. 5A
Fig. 6

REDUCED-FRICTION THREAD FORMING OR THREAD CUTTING SCREW

BACKGROUND OF THE INVENTION

The present invention relates to screws, taps, studs, and similar thread forming fasteners. More particularly, the present invention relates to a screw or tap which creates, by forming or cutting, threads in a workpiece or article of interest with a reduced amount of torsional force as compared to presently known fasteners.

Various screws having a variety of helical thread configurations are known in the art. There are two main types of screws. The first type cuts a corresponding or female thread in a hole in a workpiece, or article of interest such as wood, polymer, or metal. Much like a drill bit, such screws produce swarf and chips as they are driven into the workpiece. These screws are known as thread-cutting screws. The second type of screw forms or rolls a female thread in the workpiece by deforming or displacing the material of the workpiece in which the thread is formed. These screws are known as thread-forming or self-tapping screws.

The configuration of the thread on the screw, whether it be of the thread-forming or thread-cutting type, plays an important role in the ability of the screw to maintain assembly integrity. This is sometimes referred to as joint pre-load or pre-stress. Joint pre-load or pre-stress refers to the amount of tension necessary to maintain a joint or joint assembly under environmental conditions such as vibration. The joint assembly includes the fastener, the component being held by the fastener, and the workpiece.

The configuration of the thread also plays an important role in the amount of driving torque required to drive a screw completely into a workpiece. As a screw is threaded into a workpiece, more and more threads engage the workpiece. Each additional thread engaged with the workpiece increases the frictional force between it and the screw. This phenomenon is sometimes referred to as incremental friction increase. As the frictional force increases, the amount of torque required to drive the screw into the workpiece increases. Among other problems created by it, incremental friction increase often causes deformation of the helical female thread formed in the workpiece and an interface mismatch between the male and female thread, resulting in elevated stress points in tension. Stress points occur when the formed female threads are not uniform. Irregularities in the female thread, or high points, will engage the male thread at certain points. Each point of engagement is referred to as a stress point.

There have been numerous prior-art devices developed in an attempt to provide a screw having a thread configuration which affords consistent pre-stress or pre-load in the joint assembly, but requires relatively low driving torque for thread formation. Generally, the prior-art devices disclose threads of various sizes, shapes, and lobulation. As is known in the art, threads are described according to their major (crest), pitch, and minor (root) diameters, thread angle, and other known characteristics. Screws are said to have a lead, work-entering, or tapered portion which typically has one or more threads of increasing diameter and is the first section of the screw inserted into a workpiece. Following the lead portion may, depending on the screw, be a sizing, pilot, or forming portion. This portion may include one or more threads which form the female thread in the workpiece. Following the forming portion is a work holding portion. The threads in the work holding portion engage the female threads formed in the workpiece by the forming portion of the screw. Finally, a coupling means such as a slot, recess, or external hexagon is provided in the end of the screw opposite the lead portion so that a screwdriver or other tool may be used to drive the screw into the workpiece.

One prior-art device is shown in U.S. Pat. No. 3,351,115, issued to Boehlow. Boehlow discloses a thread forming screw having a forming portion with one or more threads of constant crest diameter and a plurality of threads on its work holding portion of a smaller, constant crest diameter.

U.S. Pat. No. 3,935,785, issued to Lathom, discloses a thread swaging screw having a threaded work holding portion of polygonal cross-section, a forming portion of circular cross-section, and a tapered lead portion.

U.S. Pat. No. 3,939,512, issued to Thurston et al., discloses a method of making a screw. A screw made according to the Thurston et al. method has a threaded work holding portion, a forming portion, and a tapered lead portion. The threads on the forming and lead portions are of lobular shape. The threads on the forming portion have a lobular diameter which is greater than the diameter of the crests on the work holding portion. The root diameter of the forming portion is the same as the root diameter of the work holding portion.

U.S. Pat. No. 4,040,328, issued to Muenchinger, discloses a thread-forming screw which also has a work-holding portion, a lead portion, and a forming portion. The work-holding, lead, and forming portions are all of lobular cross-section.

While the prior-art devices have been satisfactory for some purposes, there still exists a need for a screw which creates a consistent tensile stress in the joint assembly, but requires a relatively low driving torque heretofore unachieved. Further, there is a need for a screw which creates a consistent, uniform female thread when driven into a workpiece of interest.

OBJECTS AND SUMMARY OF THE INVENTION

Therefore, it is an object of the present invention to provide a screw having a relatively low thread forming or thread-cutting torque with a corresponding reduced seating torque to achieve a specific stress level in the joint or joint assembly.

A further object of the present invention is to provide a screw which requires relatively low driving torque in order to be driven into a workpiece of interest.

A further object of the present invention is to provide a screw that creates threads in a workpiece or article of interest by tapping, i.e., cutting or forming, with relieved engagement following the first full thread configuration.

A further object of the present invention is to provide a screw that reduces incremental friction increase resulting in reduced breakage of screws during driving and the production or formation of a relatively highly uniform and consistent helical female thread in the workpiece of interest.

These and other objects and advantages are achieved in thread-forming screw that includes a cylindrical shank directed along a longitudinal axis which has a first end and a second end. The shank has a work holding portion, a lead portion, and a forming portion which is intermediate the work holding and lead portions. A plurality of helical threads having constant crest, root, and pitch diameters and of circular cross-section are located on the work holding portion. Preferably, one full thread is located on the forming portion of the screw.

The thread on the forming portion of the screw is lobular-shaped and has a lobular diameter which is greater than the crest diameter of the helical threads on the holding portion. This one full thread also has a root diameter which is larger than the root diameter of the helical threads. The pitch diameter of the forming thread is similarly increased. The lead portion, which may be tapered in a conical shape, typically in a helical spiroid, has at least a fraction of a lead thread.

An alternative form of the present invention is a thread cutting screw. In the thread cutting form, the screw includes a cylindrical shank directed along a longitudinal axis. The shank has a first end, a second end, at least one groove having a cutting edge, and a threaded portion. The threaded portion includes a plurality of main threads of constant crest, root, and pitch diameters; at least a portion of a lead thread; and a cutting thread intermediate the main threads and the lead thread. The cutting thread has a crest diameter which is greater than the crest diameter of the plurality of main threads, a root diameter which is larger than the root diameter of the plurality of main threads, and a proportionally larger pitch diameter. A coupling means is located at the second end of the cylindrical shank for accepting or coupling with a driving tool such as a screwdriver.

Further objects and advantages of the present invention will become more apparent from the following detailed description of the preferred embodiments taken in combination with the accompanying drawings.

BRIEF DESCRIPTION OF THE DRAWINGS

In FIG. 2, the relieved engagement of the screw and the workpiece has been exaggerated for purposes of illustration.

FIG. 4 is a side elevational view of a second thread forming tap constructed in accordance with the present invention.

FIG. 5 is a longitudinal cross-section taken along line 5—5 of FIG. 4 is a longitudinal cross-section taken along line 5—5 of FIG. 4 and shows the tap of FIG. 4 engaged in a workpiece. In FIG. 5, the relieved engagement of the tap and workpiece has been exaggerated for purposes of illustration.

FIG. 5A is an enlarged detail of adjacent threads in the longitudinal cross-section of FIG. 5.

FIG. 6 is a cross section taken along the line 6—6 of FIG. 4.

In FIG. 8, the relieved engagement of the screw and workpiece has been exaggerated for purposes of illustration.

In FIG. 11, the relieved engagement of the tap and workpiece has been exaggerated for purposes of illustration.

DETAILED DESCRIPTION OF THE INVENTION

Figure 1:
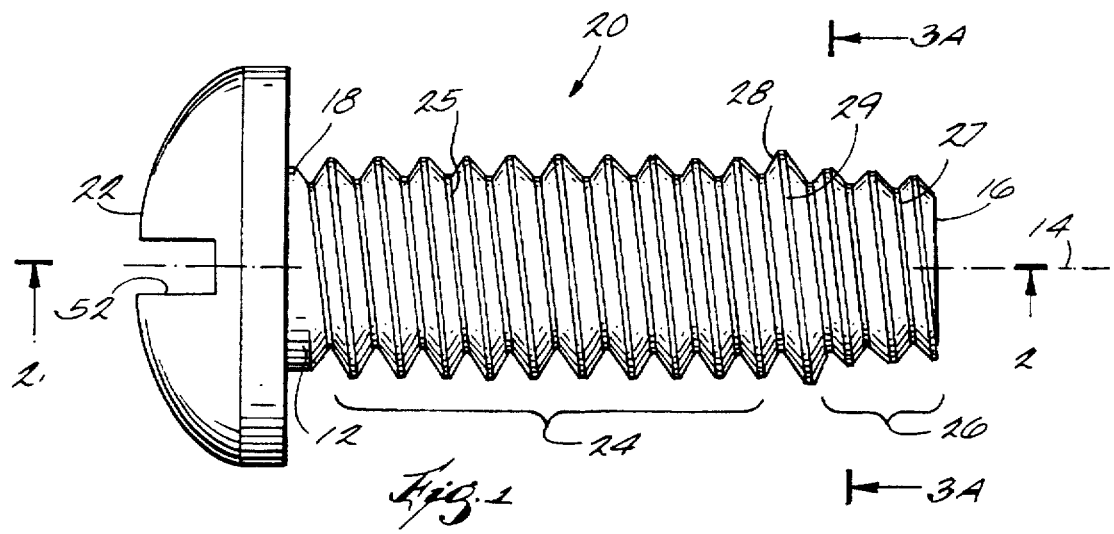
FIG. 1 is a side elevational view of a thread forming screw constructed in accordance with the present invention.
Figure 2:
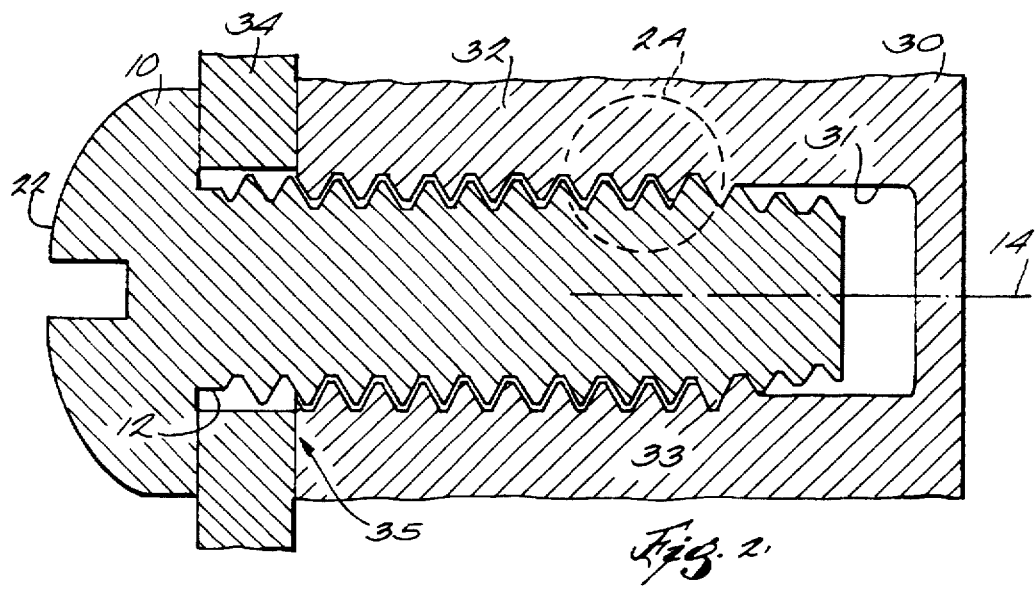
FIG. 2 is a longitudinal cross-section taken along line 2—2 of FIG. 1 and shows the screw of FIG. 1 engaged in a workpiece.

With reference to the drawings, a screw for forming threads is shown at 10 in FIGS. 1–3. The screw 10 shown in FIGS. 1–3 is a thread-forming screw having a cylindrical shank 12 directed along a longitudinal axis 14 and has a first end 16 and a second end 18. A plurality of threads 20 is formed on the cylindrical shank 12 and each thread advances circumferentially about the axis 14 from the first end 16 toward the second end 18. A head portion 22 is located at the second end 18. The threads 20 are comprised of main threads 24 positioned on a work holding portion 25, lead threads 26 positioned on a lead portion 27, and a forming thread 28 formed on a forming portion 29 intermediate the lead portion 25 and the work holding portion 25.

A "thread" is a portion of the helical groove (or thread form) on the shank 12 encompassed by one "pitch." The pitch is the distance measured parallel with the longitudinal axis 14 between corresponding points on adjacent thread forms in the same axial plane and on the same side of the axis 14.

As shown in FIG. 2, the screw 20 is designed to be turned into a workpiece 30 having a bore or tap 31 and to form a plurality of female threads 32. The screw 20 may be used to fasten an article of interest 34 to the workpiece 30 to form a joint assembly 35.

Figure 2A:
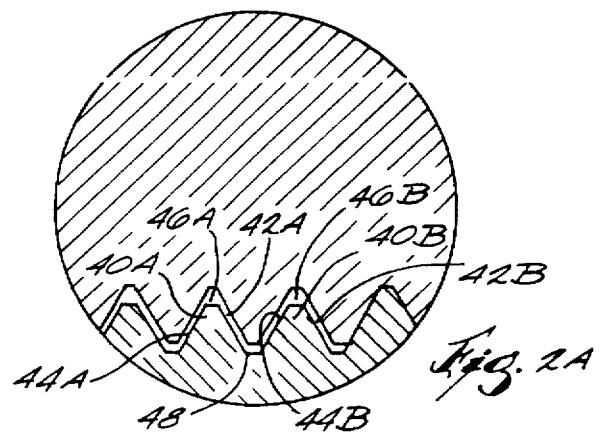
FIG. 2A is an enlarged detail of adjacent threads in the longitudinal cross-section of FIG. 2.

FIG. 2A shows an enlarged detail of typical adjacent threads 40A and 40B of the main threads 24. The thread 40A includes a first flank 42A and a second flank 44A that are inclined at angles to meet at a crest 46A. Similarly, the thread 40B which is immediately adjacent the thread 40A has a first flank 42B and a second flank 44B that are inclined at angles to meet at a crest 46B. The first flank 42A of the thread 40A and the second flank 44B of the thread 40B meet at a root 48. It is to be understood that the individual adjacent threads 40A and 40B are representative of only two of the main threads 24, and that the main threads 24 may constitute a plurality of substantially identical, successive threads that advance circumferentially between the forming thread 28 and the second end 18. The number of the main threads 24 depends on the length of the shank 12 and the profile and size of each of the main threads 24.

As noted earlier, the thread characteristics may be described according to certain diameters. An imaginary cylinder that would bound the crests 46A and 46B (and other crests of the main threads 24) is commonly referred to as a "major cylinder" and an imaginary cylinder that would bound the root 48 (and other roots of the main threads 24) is commonly referred to as a "minor cylinder." The "height" of a thread is the distance, measured radially, between the major and minor cylinders. Alternatively expressed, the height of the thread is the difference between the radius of the major cylinder and the radius of the minor cylinder. The "major diameter" and the "minor diameter" are the diameters of the "major cylinder" and "minor cylinder," respectively.

For the case depicted in FIG. 2A, the crests 46A and 46B are somewhat flattened, that is, the flanks 42A and 44A, and the crests 42B and 44B, do not meet to form a sharp V-type intersection. If the flanks 42A and 44A, and the flanks 42B and 44B, were extended by an imaginary line to a sharp V-type intersection, such an intersection would be referred to as a "sharp crest," and an imaginary cylinder that would bound the sharp crests would be referred to as a "sharp major cylinder." The root 48 is also shown somewhat flattened, that is, the flanks 44A and 42B do not meet to form a sharp V-type intersection. If the flanks 44A and 42B were extended by an imaginary line to a sharp V-type intersection, that intersection would be referred to as a "sharp root," and an imaginary cylinder that would bound the sharp roots would be referred to as a "sharp minor cylinder." For the case of a sharp V-thread screw, the "major cylinder" and the "sharp major cylinder" would be the same. Similarly, for the case of a sharp V-thread screw, the "minor cylinder" and the "sharp minor cylinder" would also be the same. The "pitch cylinder" of a screw is located equidistantly between the sharp major and sharp minor cylinders of a given thread form. The "pitch diameter" is the diameter of the pitch cylinder.

The lead threads 26 are formed at the first end 16 of the cylindrical shank 12. The lead threads 26 are fully formed at the root, and may or may not be fully formed at the crest. The lead threads 26 are tapered such that a "major cone" and a "minor cone" are formed, analogous to the "major cylinder" and the "minor cylinder" of the main threads 24. The "height" of a given lead thread is the distance, measured radially, between the major and minor cones. For the case of the lead threads 26, the "major diameter" and the "minor diameter" at a given position on the axis 14 are the diameters of the "major cone" and "minor cone," respectively, at that position.

Figure 3A:
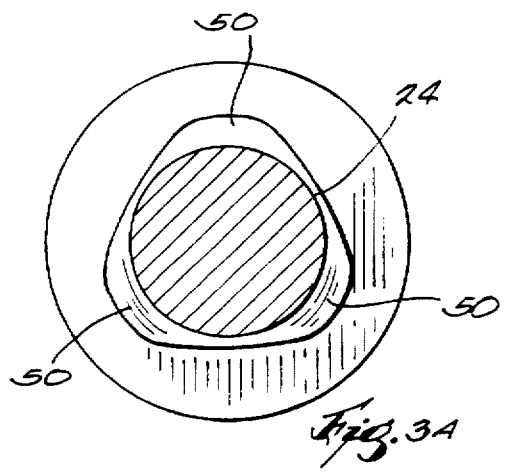
FIG. 3A is a right end view taken along line 3A—3A of FIG. 1, showing a forming thread having three lobes.
Figure 3B:
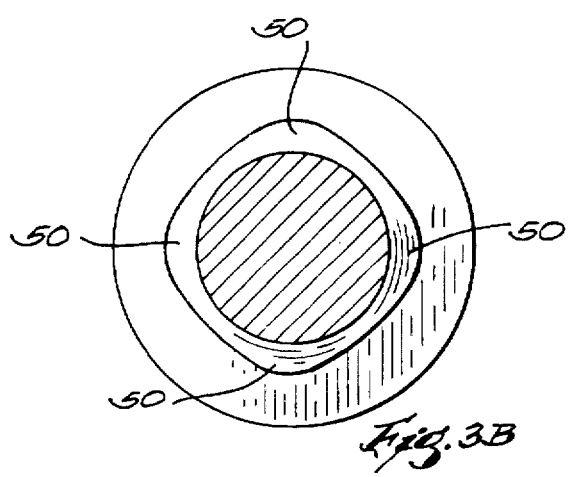
FIG. 3B is a right end view of an alternate embodiment of the thread forming screw, showing a forming thread having four lobes.
Figure 3C:
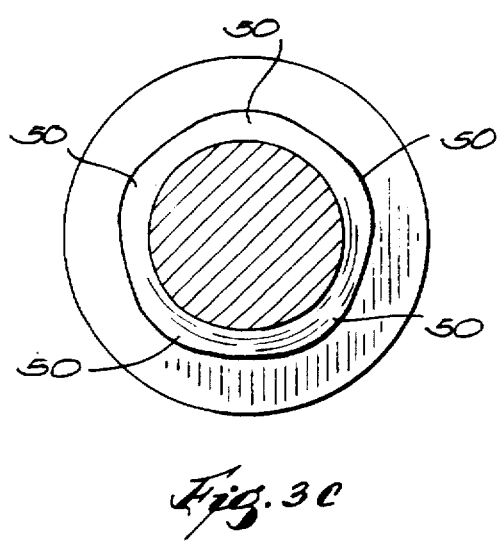
FIG. 3C is a right end view of a second alternate embodiment of the thread forming screw, showing a forming thread having five lobes.
Figure 3D:
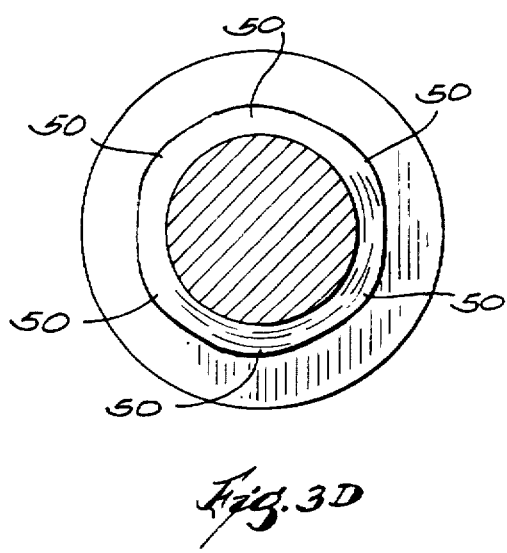
FIG. 3D is a right end view of a third alternate embodiment of the thread forming screw, showing a forming thread having six lobes.

The forming thread 28 is formed intermediate the lead threads 26 and the main threads 24. As shown in FIGS. 3A–3D, the thread 28 is a forming thread and includes a lobe or lobes 50 that project radially outwardly beyond the major diameter of the main threads 24 (FIG. 3A). The actual size of the lobes 50 may vary, and depends somewhat upon the material into which the screw 10 is being turned. The shape of the lobes 50 as is shown in the figures is one of many possible shapes. For example, for the case of a three-lobed geometry, one possible configuration is a Rouleaux triangle geometry. Regardless of the exact geometry, the minor diameter of the thread 28 is preferably larger than the minor diameter of the main threads 24, and the major diameter of the forming thread 28 is preferably larger than the major diameter of the main threads 24. Therefore, the height of the thread 28 (not including the lobes 50) is preferably greater than the height of the main threads 24. It has been found that a typical major, minor, and pitch diameter of the forming thread 28 should be about 0.001" greater than the respective diameters of the main threads.

The thread profile of the main forming or cutting thread 28 will be proportionally larger than the lead thread 24 profile by an increase only sufficient to compensate for workpiece material elastic recovery from its plastic deformation state with minimum clearance.

The lobe geometry is such that the lobes 50 are circumferentially equidistant from each other, and there may be three, four, five, or six lobes, respectively. Other numbers of lobes are theoretically possible, but three or four lobes are considered preferable. It has been found that minimal thread forming torque is achieved when the forming thread is restricted to one complete helical revolution.

As best seen in FIG. 2, the head portion 22 includes a slot 52 or other socket or other means to receive (couple) a tool such as a screwdriver. When engaged in the slot 52 of the cylindrical shank 12, a driving mechanism such as a screwdriver may be used to turn the cylindrical shank 12 about the longitudinal axis 14. Turning the screw 10 drives it into a desired material (metal, wood, polymer, etc., represented by the workpiece 30) for fastening or other purposes. As the screw 10 is turned into the workpiece 30 it deforms the workpiece to form complementary or female threads 32 causing engagement between the screw 10 and the workpiece 30.

Forming of threads in the workpiece 30 by the screw 10 of the present invention requires less torsional force as compared to conventional forming screws now in use. The thread 28 forms the plurality of female threads 32, each of which is a corresponding thread of larger size than would be formed by a conventional screw. In addition, each of the plurality of threads 32 is lobular in shape while the main threads 24 on the work holding portion 25 are circular in cross-section. Thus, full or complete engagement around the circumference of the main threads 24 with the workpiece 30 does not occur. That is, less surface area of the threads 24 engages the surface area of the threads 32 then would occur if a conventional screw was turned into the workpiece 30. The inventor refers to this characteristic of his invention as relieved engagement.

As shown below in Table 1, a screw of the present invention requires 61% less driving torque to be driven into a workpiece as compared to conventional screws.

TABLE 1

| Sample No. | Max. Drive. Torque Lb.In. | Thread Type |
| --- | --- | --- |
| 1 | 55.0 | standard thread |
| 2 | 58.6 | " |
| 3 | 59.0 | " |
| 4 | 54.8 | " |
| 5 | 27.9 | reduced body |
| 6 | 24.1 | " |
| 7 | 18.1 | " |
| 8 | 18.2 | " |

Average standard thread drive torque 56.8 Lb.In. Average reduced body torque 22.1 Lb.In. Samples were driven by hand into a 0.500" thick test bar. The reduced body screws were driven through; the standard thread screws were driven past full engagement.

Referring to FIGS. 4–6, a second screw for forming threads in accordance with the present invention is shown at 120. The screw 120 is a thread-forming tap and has a cylindrical shank 122 aligned along an longitudinal axis 124. The screw 120 differs only from the screw 10 at its head portion 121. Since the structure and function of the screw 10 (thread-forming screw) and the screw 120 (thread-forming tap) are analogous to each other, and for purposes of brevity, the other features of the screw 120 are not set forth herein. The head portion 121 includes a square 130 or other means to engage or receive a tool such as a wrench or driver which may be used to turn the cylindrical shank 122 about the longitudinal axis 124.

Figure 7:
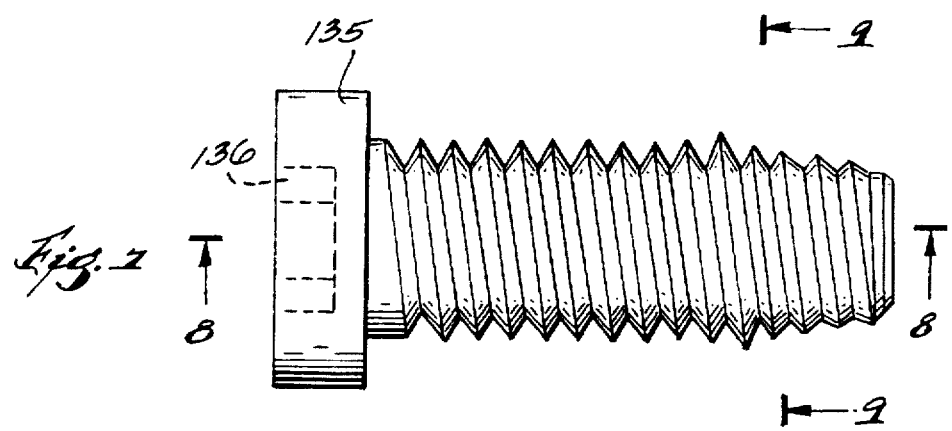
FIG. 7 is a side elevational view of a thread forming screw constructed in accordance with the present invention.
Figure 8:
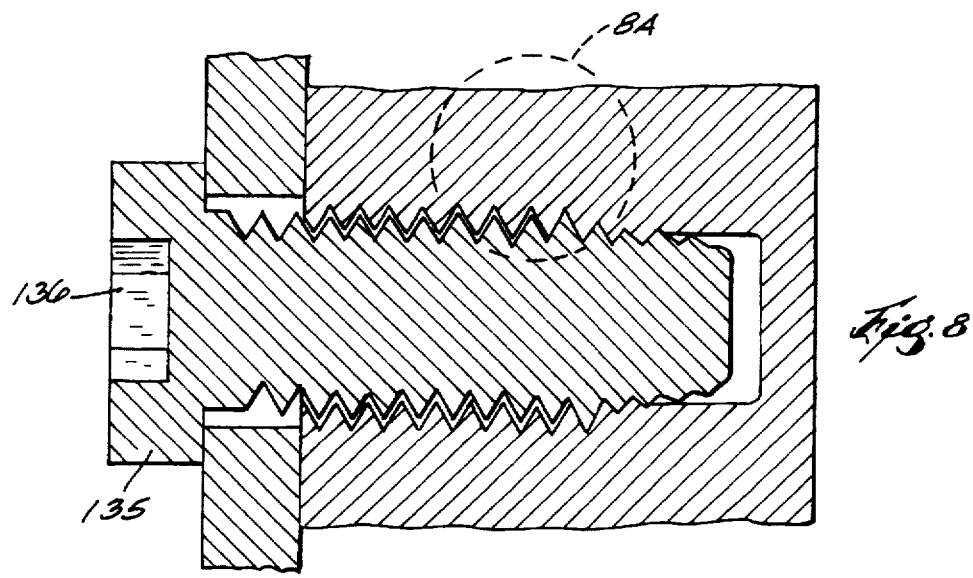
FIG. 8 is a longitudinal cross-section taken along line 8—8 of FIG. 7 and shows the screw of FIG. 7 engaged in a workpiece.
Figure 8A:
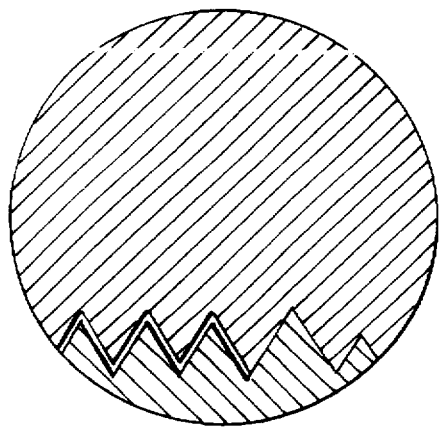
FIG. 8A is an enlarged detail of adjacent threads in the longitudinal cross-section of FIG. 8.
Figure 9:
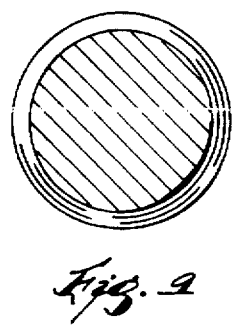
FIG. 9 is cross-section taken along line 9—9 of FIG. 7.

FIGS. 7–9 show a modified version of the screw 10 having a sharp V-type thread which is shown as V-thread screw 135 having a recess 136 which is capable of accepting a driving tool such as an hexagonal wrench (not shown). Since all the other features of the V-thread screw 135 are analogous to the screw 10, other than the V-shape of the thread, they are not discussed in further detail herein.

Figure 10:
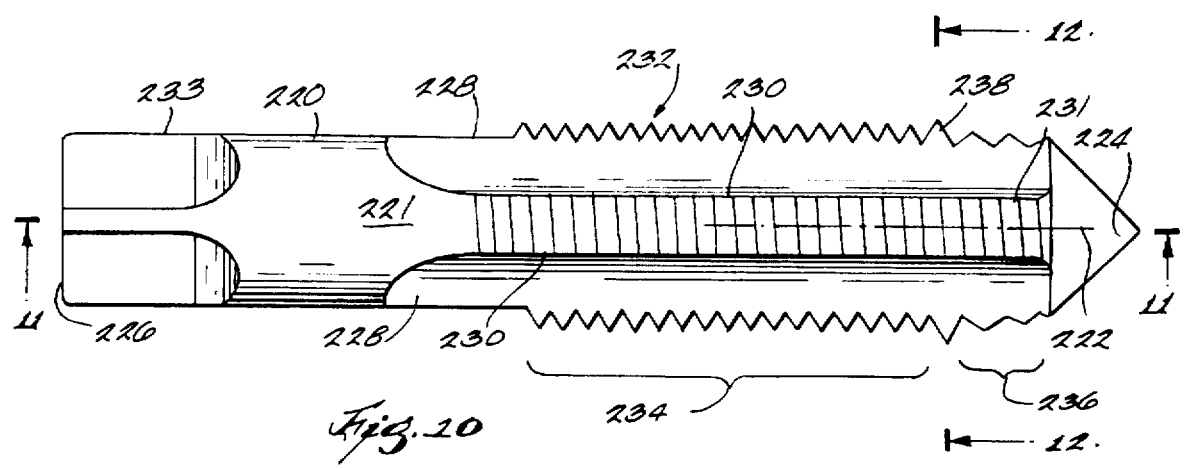
FIG. 10 is a side elevational view of a thread cutting tap constructed in accordance with the present invention.
Figure 11:
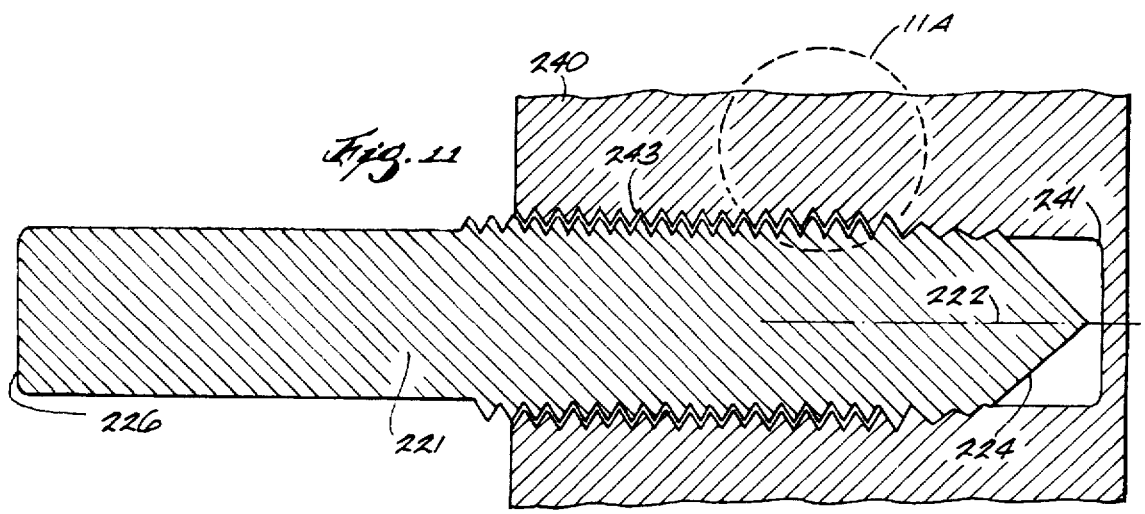
FIG. 11 is a longitudinal cross-section taken along line 11—11 of FIG. 10 and shows the tap of FIG. 10 engaged in a workpiece.
Figure 12:
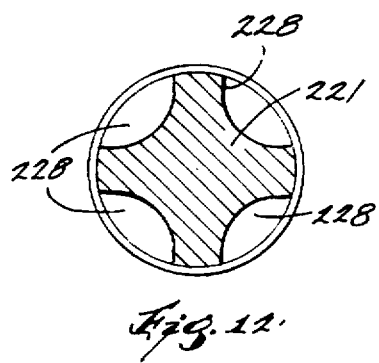
FIG. 12 is a cross section taken along the line 12—12 of FIG. 10.

Referring to FIGS. 10–12, a tap 220 for cutting threads in a workpiece is shown. The tap 220 has a cylindrical shank 221 directed along a longitudinal axis 222, a first end 224, and a second end 226. The tap 220 has a plurality of relatively smooth grooves 228 cut in the shank 221. The grooves 228 extend to a plurality of cutting edges 230. Preferably, the grooves are aligned along the axis 222 and run longitudinally along the shank. Between the grooves 228 are threaded portions 231. A plurality of threads is formed on the threaded portions 231 of the cylindrical shank 221. The threads 232 advance helically about the axis 222 from the first end 224 toward the second end 226. A square head portion 233 is located at the second end 226.

The threads 232 are comprised of main threads 234, lead threads 236, and a cutting thread 238 formed intermediate the lead threads 236 and the main threads 234. The cylindrical shank 221, the longitudinal axis 222, the first end 224, the second end 226, the threads 232, the square head portion 233, the main threads 234, the lead threads 236, the cutting thread 238, are analogous in structure and function to the cylindrical shank 12, the longitudinal axis 14, the first end 16, the second end 18, the threads 20, the head portion 22, the main threads 24, the lead threads 26, and the forming thread 28 of the screw 10. However, the cutting edges 230 cut away material rather than deform it.

As shown in FIG. 11, the tap 220 is designed to be turned into a workpiece 240 having a bore or tap 241 and to cut a plurality of female threads 242 in the workpiece 240.

Figure 11A:
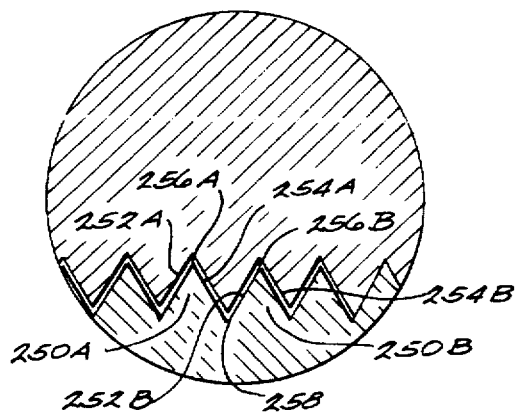
FIG. 11A is an enlarged detail of adjacent threads in the longitudinal cross-section of FIG. 11.

As shown in FIG. 11A, adjacent threads 250A and 250B of the screw article 220 include a first flank 252A, a second flank 254A, a crest 256A, a first flank 252B, a second flank 254B, a crest 256B, and a root 258. These features are similar to the representative adjacent threads 40A and 40B of the screw 10 which include the first flank 42A, the second flank 44A, the crest 46A, the first flank 42B, the second flank 44B, the crest 46B, and the root 48 (depicted in FIG. 2A). The tap 220 (thread-cutting) does not include any lobes that project outwardly beyond the major diameter of the threads 234, such as is the case for the screw 10 (thread-forming) and the screw 120 (thread-forming). However, the height of the cutting thread 238 is greater than the height of the main threads 234.

As with the screw 10, the diameter of the cutting thread 238 should be about 0.001" greater than the respective diameter of the main threads 234. Again, the critical difference in size of the cutting thread 238 will be an increase only sufficient to compensate for workpiece material elastic recovery from its plastic deformation state with minimum clearance.

When a driving mechanism is engaged with the square head portion 233, the tap 220 may be driven into a desired material such as the workpiece 240. Cutting threads in the workpiece 240 by the screw 220 requires less torsional force as compared to conventional cutting screws and taps. The cutting thread 238 forms the plurality of female threads 243, each of which is larger in size than similar threads formed conventionally. Even though the cutting thread is not lobular shaped, a relieved engagement between the threads 234 and female threads 243 occurs, resulting in a similar torsional reduction as with the screw 10.

While the present invention has been described in what is believed to be the most preferred forms, it is to be understood that the invention is not confined to the particular construction and arrangement of the components herein illustrated and described, but embraces such modified forms thereof as come within the scope of the appended claims. In particular, the teachings of the present invention may be employed with a variety of self-tapping screws and thread-cutting screws. Included within the wide variety of screws which may be modified to encompass the teachings of the present invention are numerous screws known by the following ANSI Standard Designations: AB, B, BP, BF, BT, D, F, G, and T. Other applications of the present invention would be obvious to those skilled in the art.

What is claimed is:

1. A screw for creating threads in a workpiece, the screw comprising:

a cylindrical shank;

a work holding portion on the cylindrical shank having a plurality of helical threads of a substantially constant crest diameter, a substantially constant root diameter, a substantially constant pitch diameter, and circular cross-section located thereon;

a lead portion located at a first end of the cylindrical shank having at least a portion of a helical thread located thereon;

a forming portion intermediate the work holding portion and the lead portion and having at least one full thread located thereon having a crest diameter which is greater than the crest diameter of the plurality of helical threads on the holding portion, a root diameter which is larger than the root diameter of the plurality of helical threads on the holding portion, and a pitch diameter which is proportionally greater than the pitch diameter of the threads on the holding portion; and a coupling means located at a second end of the cylindrical shank opposite the first end and capable of coupling with a driving tool.

2. The screw as claimed in claim 1, wherein the at least one full thread located on the lead portion is lobular-shaped.

3. The screw as claimed in claim 2, wherein the at least one full thread located on the lead portion has multiple lobes.

4. The screw as claimed in claim 3, wherein the lobes are equidistant to each other.

5. The screw as claimed in claim 1, wherein the coupling means is a slot.

6. The screw as claimed in claim 1, wherein the coupling means is a squared end.

7. A screw for forming threads in a workpiece, the screw comprising:

a cylindrical shank;

a work holding portion positioned on the shank and having a plurality of helical threads of a constant crest diameter, a constant root diameter, and circular cross-section located thereon;

a lead portion at a first end of the cylindrical shank and having at least a portion of a helical thread located thereon;

a forming portion intermediate the work holding portion and the lead portion and having at least one full lobular-shaped thread located thereon having a lobular diameter which is greater than the crest diameter of the plurality of helical threads on the holding portion and a root diameter which is larger than the root diameter of the plurality of helical threads on the holding portion; and a coupling means located at a second end of the cylindrical shank opposite the first end and capable of coupling with a driving tool.

8. The screw as claimed in claim 7, wherein the lobular-shaped thread has multiple lobes.

9. The screw as claimed in claim 8, wherein the lobes are equidistant to each other.

10. The screw as claimed in claim 7, wherein the coupling means is a slot.

11. The screw as claimed in claim 7, wherein the coupling means is a squared end.

12. A device that creates threads in a workpiece, the device comprising:

a cylindrical shank having a threaded portion formed thereon; the threaded portion having a plurality of main threads of a substantially constant crest diameter, a substantially constant root diameter, and a substantially constant pitch diameter, at least a portion of a lead thread, and a thread intermediate the main threads and the lead thread and having a crest diameter which is greater than the crest diameter of the plurality of main threads, a root diameter which is larger than the root diameter of the plurality of main threads, and a pitch diameter which is proportionally larger than the pitch diameter of the plurality of main threads; and a coupling means located at one end of the cylindrical shank capable of coupling with a driving tool.

13. The device as claimed in claim 12, wherein the shank includes at least one groove that passes through the thread intermediate the main threads and the lead thread.

14. The device as claimed in claim 13, wherein there is a relieved engagement between the threads created in the workpiece and the main threads when the device is turned into the workpiece.

15. A tap for cutting threads in a workpiece, the tap comprising:

a cylindrical shank having at least one groove formed therein, the at least one groove having a cutting edge, and a threaded portion formed on the shank; the threaded portion having a plurality of main threads of a substantially constant crest diameter, a substantially constant root diameter, and a substantially constant pitch diameter, at least a portion of a lead thread, and a cutting thread intermediate the main threads and lead thread and having a crest diameter which is greater than the crest diameter of the plurality of main threads, a root diameter which is larger than the root diameter of the plurality of main threads, and a pitch diameter which is proportionally larger than the pitch diameter of the plurality of main threads; and a coupling means located at one end of the cylindrical shank capable of coupling with a driving tool.

16. The tap as claimed in claim 15, wherein the coupling means is a slot.

17. The tap as claimed in claim 15, wherein the coupling means is a squared end.

18. The tap as claimed in claim 15, wherein the coupling means is a square head.

19. The tap as claimed in claim 15, wherein the coupling means is a recess.

20. The tap as claimed in claim 15, wherein the at least one groove runs longitudinally along the shank.

* * * * *